United States Patent Office 3,697,488
Patented Oct. 10, 1972

3,697,488
PROCESS FOR POLYMERIZING EPISULFIDES
Llewellyn Delphin Booth, Lake Jackson, Tex., assignor to The Dow Chemical Company, Midland, Mich.
No Drawing. Continuation-in-part of application Ser. No. 52,124, July 2, 1970, which is a continuation-in-part of application Ser. No. 701,537, June 30, 1968. This application June 14, 1971, Ser. No. 153,008
Int. Cl. C08f 3/84
U.S. Cl. 260—79.7     10 Claims

ABSTRACT OF THE DISCLOSURE

A process for polymerizing episulfides which comprises contacting, at a temperature of 0° to 120° C., episulfides with 0.1 to 10.0 percent by weight of monomeric or polymeric zinc salts of 3,3'-thiodipropionic acid.

---

This application is a continuation-in-part of my application Ser. No. 52,124 filed on July 2, 1970 now abandoned, which is a continuation-in-part of my application Ser. No. 701,537 filed on June 30, 1968 now abandoned.

BACKGROUND OF THE INVENTION

Zinc salts are well known for polymerizing episulfides. However, the instant invention is the discovery that the monomeric and polymeric zinc salts of 3,3'-thiodipropionic acid are unique in that they are superior catalysts for producing high molecular weight episulfide polymers, which can then be vulcanized into rubber.

SUMMARY OF THE INVENTION

The instant invention is a process for polymerizing episulfides comprising contacting said episulfides with a catalytic amount of monomeric or polymeric zinc salts of 3,3'-thiodipropionic acid.

The episulfides which are suitable for the process of this invention are those well known in the art, which can be polymerized with zinc or cadmium salts. Examples of these episulfides are inertly substituted or unsubstituted alkylene sulfides, such as, for example, ethylene sulfide, propylene sulfide, 1,2-butylene sulfide, 2,3-butylene sulfide, styrene sulfide and allyloxymethyl thiirane and the like; inertly substituted or unsubstituted cycloalkylene sulfides, such as, for example, cyclopentene sulfide and cyclohexene sulfide and the like; and, inertly substituted or unsubstituted alkadiene sulfides, such as, for example, butadiene sulfide and the like.

Among the catalysts that are suitable for the instant invention are the zinc salts of 3,3'-thiodipropionic acid. A catalytic amount of the salt is necessary for the polymerization to occur, generally 0.1 to 10 percent by weight of said catalyst, and preferably about 1 to 3 percent by weight.

While it is easier to prepare the polymeric zinc salts of 3,3'-thiodipropionic acid than the monomeric salts, there are only slight differences in the two catalysts. The polymeric salts give slightly faster conversion rates, while the monomeric salts give slightly higher molecular weight polymers.

The monomeric zinc salt of 3,3'-thiodipropionic acid is commercially available from Carlisle Chemical Works, Inc. and may be represented by the general formula

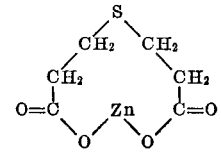

The polymeric form of the zinc salt of 3,3'-thiodipropionic acid may be prepared by reacting in a solvent or inert liquid medium, a dialkyl zinc compound such as diethyl zinc and 3,3'-thiodipropionic acid by the drop-wise addition of a solution of 3,3'-thiodipropionic acid to the dialkyl zinc compound in an inert liquid medium under reflux conditions and thereafter digesting at a temperature of from about 25 to about 75° C. for from about 1 to about 3 hours.

The above procedure produces a mixture of about 20% monomeric zinc 3,3'-thiodipropionate and about 80% of a substantially linear polymeric form which may be represented by the following formula

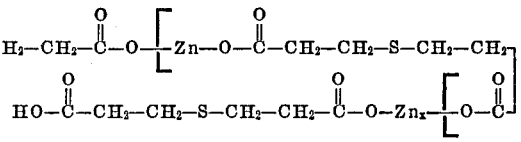

wherein $x$ may have an average value of from 1 to about 20 and above.

Mixtures in any proportions of the monomeric and polymeric forms of the zinc salt of 3,3'-thiodipropionic acid may be employed i.e. from about 1% to about 99% monomeric to about 99% to 1% polymeric and suitably from about 15% to about 25% monomeric and 85 to about 75% polymeric, percentages being by weight.

The instant invention suitably occurs at atmospheric or autogeneous pressure. A temperature of 0° to 120° C. is suitable, and about 20° to 50° C. is preferred.

Example 1

The following runs were made by placing 50 ml. of freshly distilled propylene sulfide, 100 ml. of dry benzene (distilled over sodium) and 2 gm. of the indicated catalyst in citrate bottles. The bottles were capped and caged and the runs allowed to stand at room temperature for the indicated hours. The results are given in Table I below:

TABLE I

| Run | Catalyst | Hours | Red [1] | Grams yield |
|---|---|---|---|---|
| 1 | Zinc thiodipropionate [2] | 16 | 3.48 | 46.5 |
| 2 | do [3] | 48 | 4.67 | 46.0 |

[1] Reduced viscosity (.2 g./100 cc. methylene chloride at 30° C.).
[2] Polymeric—prepared in laboratory employing the following procedure: To a 2 liter, 3-neck flask, fitted with stirrer, thermometer and condenser was added 617 g. of 20% ZnEt₂ in hexane. 175 g. of thiodipropionic acid was dissolved in 300 ml. of dimethylformamide. This solution was added drop-wise with good stirring. A nitrogen purge was kept on the system during the reaction. A strong exotherm kept the reaction at reflux temperature during the addition. After the addition was complete the material was refluxed for 1½ hours then cooled and the solid was filtered off and washed in hexane. The solid was dried overnight in vacuum (25–30 inches) at 40° C., but still contained solvent. Drying was continued at 60° C. for 24 hours in vacuum (25–30 inches Hg). The solid weighed 241 g. for a 100% conversion. Infrared analysis of the product indicated that it contained about 20% monomeric zinc 3,3'-thiodipropionate and about 80% of a linear polymeric form of undetermined molecular weight.
[3] Monomeric—commercially available from Carlisle Chemical Works, Inc.

Example 2

A citrate bottle was charged with 51 gm. of ethylene sulfide, 4 gm. of allyloxymethylthiirane, and 1 gram of zinc thiodipropionate (monomeric). The bottle was capped and agitated at room temperature for 72 hours. 30 gm. of a white powdery solid was recovered, said solid being readily molded at 310° F. It formed a strong film.

Example 3

To each of six citrate bottles was added 100 gm. of a mixture of 60 percent by weight hexane and 40 percent by weight of a mixture of 70 percent by weight propylene sulfide, 20 percent by weight ethylene sulfide and 10 percent by weight allyloxymethylthiirane. After adding zinc thiodipropionate catalyst in the indicated quantities, based on total monomer, the bottles were capped and allowed to remain at room temperature for 24 to 96 hours as indicated. The results are given in Table II below:

TABLE II

| Run | Percent catalyst | Grams | Hours | Yield of polymer | |
|---|---|---|---|---|---|
| | | | | Grams | Percent |
| A | 1.5 | 0.6 | 24 | 36.0 | 90 |
| B | 1.0 | 0.4 | 24 | 31.5 | 78.8 |
| C | 0.5 | 0.2 | 24 | 12.7 | 31.8 |
| D | 0.3 | 0.12 | 96 | 26.7 | 66.8 |
| E | 0.2 | 0.08 | 96 | 19.0 | 47.5 |
| F | 0.1 | 0.04 | 96 | 11.8 | 29.5 |

Example 4

A citrate bottle was charged with 1.5 grams of zinc thiodipropionate, 100 grams of hexane and 80 grams of ethylene sulfide. The bottle was capped and agitated at room temperature for 72 hours. The bottle was then opened and the solid ethylene sulfide was filtered and dried in vacuum. 66 grams of solid polymer was recovered, said solid having a melting point of 206° to 208° C.

I claim:

1. A process for polymerizing episulfides which comprises contacting said episulfides with a catalytic amount of polymeric or monomeric zinc salts of 3,3'-thiodipropionic acid; wherein the polymeric zinc salt is represented by the general formula

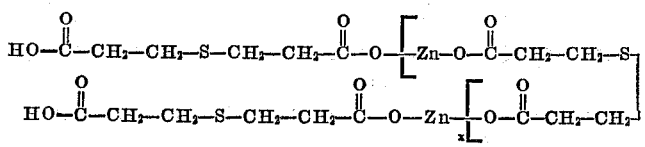

wherein $x$ has an average value of from 1 to about 20.

2. The process of claim 1 wherein the temperature is from 0° to 120° C.

3. The process of claim 1 wherein the percent by weight of catalyst is 0.1 to 10 percent.

4. The process of claim 1 wherein the catalyst is in the polymeric form.

5. The process of claim 1 wherein the catalyst is in the monomeric form.

6. The process of claim 1 wherein the episulfide is an alkylene sulfide.

7. The process of claim 1 wherein the episulfide is a cycloalkylene sulfide.

8. The process of claim 1 wherein the episulfide is a butadiene sulfide.

9. The process of claim 1 wherein the episulfide is allyloxymethylthiirane.

10. The process of claim 1 wherein the episulfide is a mixture of episulfides.

References Cited

UNITED STATES PATENTS 3,359,248   12/1967   Osborn et al. _____ 260—79.7

DONALD E. CZAJA, Primary Examiner

M. I. MARQUIS, Assistant Examiner

U.S. Cl. X.R.

260—79